United States Patent [19]  [11] Patent Number: 4,612,021
Bland et al.  [45] Date of Patent: Sep. 16, 1986

[54] CONTACTING A GAS AND A LIQUID TO REMOVE AN UNWANTED GAS

[76] Inventors: Sarah E. L. Bland, 7 Dovehouse close, Bromham, Bedford MK43 8PS, Great Britain; Murray H. Palmer, 14 Rectory Orchard, Lavendon, Olney, Buckinghamshire, England, MK46 4HB

[21] Appl. No.: 711,569
[22] PCT Filed: Jul. 9, 1984
[86] PCT No.: PCT/GB84/00243
  § 371 Date: Mar. 7, 1985
  § 102(e) Date: Mar. 7, 1985
[87] PCT Pub. No.: WO85/00298
  PCT Pub. Date: Jan. 31, 1985

[30] Foreign Application Priority Data
  Jul. 7, 1983 [GB] United Kingdom ............. 8318450

[51] Int. Cl.⁴ .............................................. B01D 19/00
[52] U.S. Cl. ........................................... 55/53; 55/196; 175/66
[58] Field of Search .................. 55/38, 40, 41, 44, 52, 55/53, 55, 189, 194, 196; 175/66, 206

[56] References Cited
U.S. PATENT DOCUMENTS 3,815,330 6/1974 Lawley ..................... 55/196 X
4,023,941 5/1977 Miller ....................... 55/203 X
4,136,747 1/1979 Mallory et al. ............... 175/66
4,415,341 11/1983 Echtler ......................... 55/53

FOREIGN PATENT DOCUMENTS 3143459 5/1983 Fed. Rep. of Germany .
2345397 3/1977 France .
WO/83/024-
  02 7/1983 PCT Int'l Appl. .
1531537 11/1978 United Kingdom .

Primary Examiner—Charles Hart
Attorney, Agent, or Firm—Shapiro and Shapiro

[57] ABSTRACT

Sea water containing dissolved oxygen is pumped through a main gas ejector (4) supplied with nitrogen. During flow of the sea water and entrained nitrogen from the main gas ejector (4) to an auxiliary gas ejector (5), part of the entrained nitrogen is dissolved and displaces dissolved oxygen from solution. Most of the mixed nitrogen and oxygen collected in a separation chamber (6) is passed through a catalytic burner (7) to remove the unwanted oxygen which is replaced by nitrogen from a make-up source (9) and the resultant nitrogen mixture is fed to the main gas ejector (4) which is operated so as to provide sufficient suction to draw gas through the catalytic burner (7). Part of the mixed nitrogen and oxygen collected in the separation chamber (6) is fed to the auxiliary gas ejector (5) which is operated so as to increase the gas to liquid interface. Sea water and entrained nitrogen flow from the auxiliary gas ejector (5) to the separation chamber (6) through a stepped desorption tube (3) which causes additional turbulence and retards the flow of sea water thereby enhancing the solution of nitrogen and removal of oxygen. Sea water with reduced dissolved oxygen is continuously removed from the separation chamber (6).

18 Claims, 1 Drawing Figure

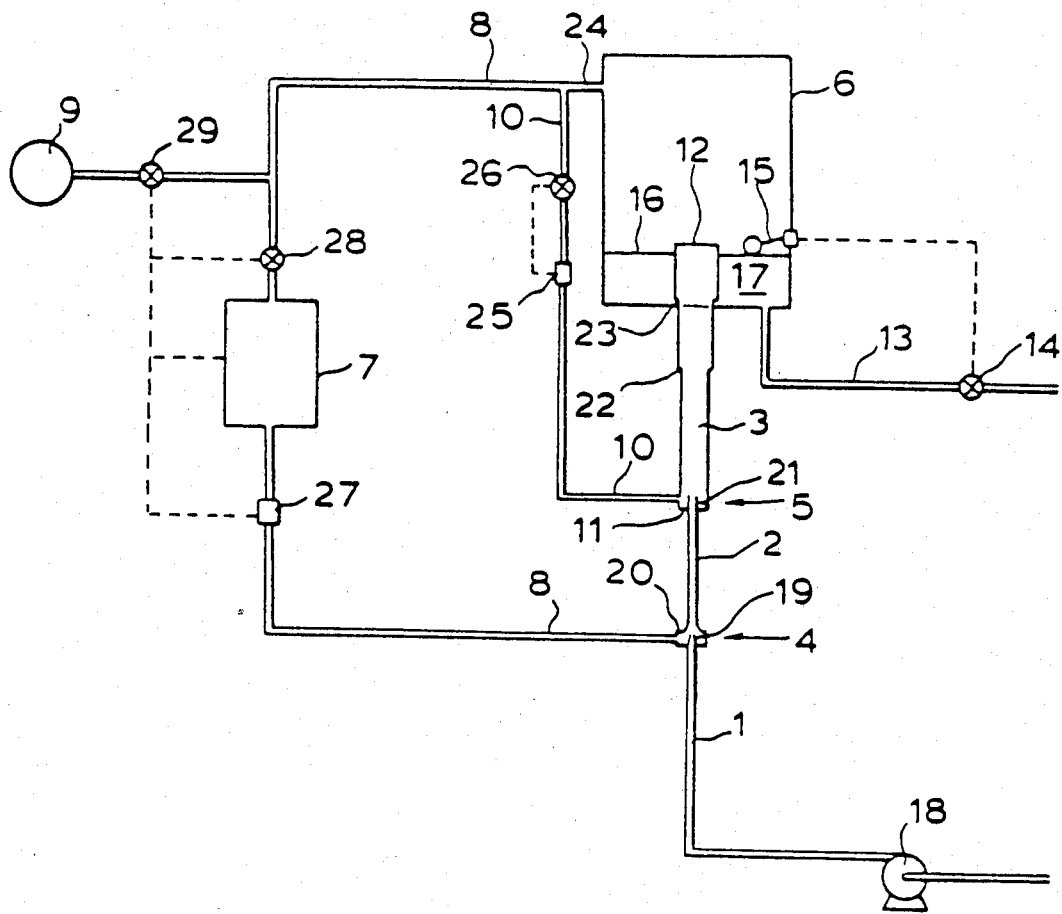

CONTACTING A GAS AND A LIQUID TO REMOVE AN UNWANTED GAS

TECHNICAL FIELD

The invention relates to the contact and mass transfer of gas into a liquid with particular application to extract dissolved oxygen from sea water by dissolving nitrogen in its place. The de-oxygenated sea water is then pumped into oil wells drilled in the sea bed.

BACKGROUND ART

In many industrial processes, a gas and a liquid are brought into intimate contact to achieve a transfer of solute gas to or from the liquid solvent.

Gas-liquid reactions with absorption and desorption are widely used in five main fields of the chemical industry, namely:

(i) Liquid phase processes: oxidation, hydrogenation, polymerization, etc.
(ii) Gas scrubbing: removal of carbon dioxide, hydrogen sulphide, carbon monoxide, etc.
(iii) Manufacture: sulphuric acid, phosphates, etc.
(iv) Biological processes: aerobic fermentation, oxidation, etc.
(v) Multi and two-phase flow: petrol refining, etc.

Typical examples of the equipment used for such reactions are packed columns, spray columns, plate columns or mechanically agitated vessels. The present invention is concerned with new apparatus which has been developed for the desorption of a gas using a liquid phase process where one gas is replaced in solution by another.

Known apparatus for extracting a dissolved first gas from a liquid comprises a liquid conduit for conveying the liquid; gas/liquid contacting means for dissolving a second gas in the liquid to replace the first gas; and separating means for collecting and removing the first gas driven out of solution from the liquid.

Usually, such a reaction would take place in a packed column, where the column packing is designed to provide a large interface area through which mass transfer can take place. Packed columns must therefore be large to provide sufficient interface area. Such large pieces of equipment can be expensive to manufacture and involve high installation costs. In certain applications, such as North Sea oil rigs, the large size of packed columns can add significantly to the cost of a complete platform.

DISCLOSURE OF THE INVENTION

According to one aspect of the invention there is provided apparatus for extracting a dissolved first gas from a liquid, including a liquid conduit for conveying the liquid; main gas ejector means provided in the liquid conduit and supplied with a second gas for dissolving the second gas in the liquid to replace the first gas; separation means for receiving liquid and a mixture of free first and second gases discharging from the liquid conduit and for separating said mixture from the discharged liquid; and cleaning means for receiving separated mixture from said separation means and for removing first gas from the received mixture; said cleaning means being connected to said main gas ejector means and said main gas ejector means being operable to provide sufficient suction to draw separated mixture of said first and second gases from said separation means to said cleaning means.

According to another aspect of the invention there is provided a method of extracting a dissolved first gas from a liquid, including the steps of passing the liquid through a liquid conduit;

dissolving a second gas in the liquid to replace the dissolved first gas by passing the liquid through main gas ejector means provided in the liquid conduit and supplied with the second gas for mixing the second gas with the liquid;

discharging liquid and a mixture of free first and second gases from said conduit into separation means and separating said mixture from the discharged liquid with said separation means;

conveying at least part of this mixture from the separation means to cleaning means and removing first gas from the conveyed mixture with said cleaning means, said cleaning means being connected to said main gas ejector means; and operating said main gas ejector means in such a manner as to provide sufficient suction to draw separated mixture of said first and second gases from the separation means and into the cleaning means.

An example of the invention will be described hereinafter with reference to the accompanying drawing which is a schematic arrangement of apparatus for removing oxygen from sea water by replacing the dissolved oxygen with nitrogen.

In use of the apparatus, for gas stripping, the volume of second gas consumed should be kept to a minimum and this may be achieved by recycling all or part of the free first and second gases discharging from the liquid conduit and passing this mixture of gases through a cleaner (cleaning means) such as a catalytic burner or filter device to remove the unwanted first gas.

Thus, in a preferred embodiment, the apparatus of the invention comprises a separation chamber for receiving liquid and a mixture of free first and second gases discharging from the liquid conduit; a catalytic burner for removing first gas conveyed from the separation chamber; and main recycling means for conveying free first and second gases from the separation chamber and into the catalytic burner and for conveying second gas from the burner to the main gas ejector. Make-up means are provided for supplying additional second gas to the main gas ejector to replace the first gas removed by the burner; and the main gas ejector is operable so as to provide sufficient suction to draw first and second gases from the separation chamber through the associated burner.

Gas flow control means may be provided for adjustably restricting the amount of free first and second gas conveyed from the separation chamber to the burner or other cleaning means and for adjustably restricting the amount of second gas supplied from the make-up means to the main gas ejector to replace the unwanted first gas removed in the cleaning means.

In order to increase the volume of second gas entrained in the liquid, the gas/liquid contacting means may comprise at least one auxiliary gas ejector provided in the liquid conduit downstream of the main gas ejector, so that no main gas ejector is downstream of any auxiliary gas ejector; and auxiliary recycling means associated with the auxiliary gas ejector may be provided for conveying free first and second gases from the separation chamber and into the associated auxiliary gas ejector. Although the recycled gas is slightly impure, the auxiliary gas ejector is not required to be operated so as to provide suction for drawing a mixture of gases through a cleaning device for the removal of the unwanted first gas and so can be designed and operated so as to improve the gas to liquid contact areas. High gas to liquid flow ratios can be maintained while at the same time the second gas is continuously purified.

Apparatus embodying the invention is hereinafter described, by way of example, with reference to the accompanying drawing.

BRIEF DESCRIPTION OF THE DRAWING

The drawing is a schematic arrangement of apparatus for removing oxygen from sea water by replacing the dissolved oxygen with nitrogen.

MODES FOR CARRYING OUT THE INVENTION

In the apparatus shown in the drawing, sea water containing dissolved oxygen is pumped by a pump 18 through an inlet pipe 1 to a main gas ejector 4 comprising a convergent nozzle 19 connected to the inlet pipe 1, a mixing chamber 20 opening into a mixing tube 2, and a first gas pipe 8 for supplying nitrogen to the mixing chamber 20. Liquid flow through the main gas ejector 4 creates a low pressure region within the chamber 20 so that nitrogen is drawn into the chamber 20 and mixes with the sea water as it passes up the mixing tube 2. The resultant liquid/gas mixture then discharges into an auxiliary gas ejector 5 formed by the lower, inlet end 11 of a mixing tube 3 which surrounds the outlet end 21 of the main gas ejector mixing tube 2 and is connected with a second gas pipe 10. Flow of liquid through the auxiliary gas ejector 5 creates a low pressure region in the inlet end 11 of the mixing tube 3 and thus draws in further gas from the gas pipe 10. The resultant liquid/gas mixture passes up the mixing tube 3 and discharges from the mixing tube 3 into a separation chamber 6 surrounding the upper, outlet end 12 of the mixing tube 3. To reduce the velocity of the flow as it discharges into the separation vessel 6, the cross section of the mixing tube 3 is increased at steps 22 and 23 to cause additional turbulence and to retard the flow.

Although, in the apparatus shown in the drawing, the sea water passes vertically upwards through the main and auxiliary gas ejectors 4 and 5, this is not necessary at the high rates of liquid flow during normal operation. Similarly, it is not necessary for the mixing tube 3 to extend vertically into the separation vessel 6.

Sea water is removed from the separation chamber 6 through an outlet pipe 13 and through a valve 14 controlled by a float sensor 15, the valve 14 and sensor 15 operating to maintain the level 16 of sea water 17 within the separation chamber 6 between predetermined limits.

The free gas issuing into the separation chamber 6 contains a proportion of unwanted oxygen which has been stripped from solution in the sea water and this gas mixture leaves the separation chamber 6 through outlet 24 and is split into two streams flowing in pipes 8 and 10 providing main and auxiliary recycling means respectively associated with the main gas ejector 4 and the auxiliary ejector 5. The stream passing through pipe 8 also passes through a catalytic burner 7 which removes the unwanted oxygen whereas the stream passing through pipe 10 passes to the auxiliary gas ejector 5. The flow rate in the pipe 10 is monitored by a flow meter 25 which controls a valve 26, whereas the flow rate in the pipe 8 is monitored by a flow meter 27 and controlled by valves 28 and 29, the valve 29 controlling the flow of pure nitrogen from a separate source 9 in order to make up for the oxygen removed in the catalytic burner 7. In an alternative arrangement, the source 9 of pure nitrogen may be omitted and fresh air may be admitted into the system via valve 29. In this case, unwanted oxygen is removed in the catalytic burner 7 so that the gas fed through the first gas pipe 8 is predominantly nitrogen, as required.

In tests using fresh water with a liquid flow rate of about one liter per second, discharging at a pressure of 2.5 bar into the separation chamber 6, two liters per second of nitrogen is entrained in the flow by a suction pressure of 100 mm of mercury. The mixing action in the transfer pipe 2 reduces the oxygen concentration in the water from 10 ppm to 0.6 ppm. This gas/liquid mixture entrains a further two liters per second of nitrogen as it discharges into the mixing tube 3 where it creates a suction pressure of 25 mm of mercury. The mixing action in the mixing tube 3 further reduces the oxygen level to 0.25 ppm and the water is discharged with this oxygen concentration. Nitrogen flow rates are two liters per second through first and second gas pipes 8 and 10 and two liters per second through the catalytic burner 7. The catalytic burner must remove the oxygen released from the water, namely 9.75 mg per second, and approximately 5 mg per second nitrogen will be required to replace the nitrogen dissolved in the water in place of the oxygen. This can be supplied by passing 6.25 mg per second of air through the valve 29 which, on passing through the catalytic burner 7 will have the oxygen removed, leaving 5 mg per second nitrogen.

We claim:

1. Apparatus, for extracting a dissolved first gas from a liquid, comprising:

a liquid conduit for conveying the liquid; main gas ejector means provided in the liquid conduit and supplied with a second gas for dissolving the second gas in the liquid to replace the first gas; separation means for receiving liquid and a mixture of free first and second gases discharging from the liquid conduit and for separating said mixture from the discharged liquid; and cleaning means for receiving separated mixture from said separation means and for removing first gas from the received mixture; said cleaning means being connected to said main gas ejector means and said main gas ejector means being operable to provide sufficient suction to draw separated mixture of said first and second gases from said separation means to said cleaning means.

2. Apparatus, according to claim 1, comprising main recycling means associated with said main gas ejector means, for conveying free first and second gases from the separation means and into the cleaning means and for conveying second gas from the cleaning means to the associated main gas ejector means; and make-up means for supplying additional second gas to the main gas ejector means to replace first gas removed by the cleaning.

3. Apparatus, according to claim 2, further comprising: auxiliary gas ejector means provided in the liquid conduit downstream of the main gas ejector means; and auxiliary recycling means associated with the auxiliary gas ejector means for conveying free first and second gases from the separation means and into the associated auxiliary gas ejector means.

4. Apparatus, according to claim 2, in which:

the downstream end of the liquid conduit comprises a mixing tube extending upwardly into the separation means and having an inlet end, an outlet end disposed within the separation means, and sides diverging in such a manner that the cross-section of the mixing tube is greater at the outlet end than at the inlet end; and in which liquid control means are provided for maintaining a level of discharged liquid in the separation means between predetermined limits.

5. Apparatus, according to claim 4, in which the lower end of the mixing tube constitutes part of said auxiliary gas ejector means.

6. Apparatus, according to claim 1, wherein said separation means comprises a separation chamber.

7. Apparatus, according to claim 1, wherein said cleaning means comprises a catalytic burner.

8. Apparatus, according to claim 1, wherein said liquid is sea water, said first gas is oxygen, and said second gas is nitrogen.

9. Apparatus, according to claim 1, wherein said main gas ejector means comprises a mixing chamber having disposed therein an inlet nozzle connected in said liquid conduit and having an inlet connected to said cleaning means.

10. A method of extracting a dissolved first gas from a liquid, including the steps of:

passing the liquid through a liquid conduit;

dissolving a second gas in the liquid to replace the dissolved first gas by passing the liquid through main gas ejector means provided in the liquid conduit and supplied with the second gas for mixing the second gas with the liquid;

discharging liquid and a mixture of free first and second gases from said conduit into separation means and separating said mixture from the discharged liquid with said separation means;

conveying at least part of this mixture from the separation means to cleaning means and removing first gas from the conveyed mixture with said cleaning means, said cleaning means being connected to said main gas ejector means; and operating said main gas ejector means in such a manner as to provide sufficient suction to draw separated mixture of said first and second gases from the separation means and into the cleaning means.

11. A method, according to claim 10, in which:

second gas is conveyed to the main gas ejector means from the cleaning means and from make-up means for supplying additional second gas to replace the second gas removed by the cleaning means.

12. A method, according to claim 10, in which second gas is dissolved in the liquid by conveying part of the mixture separated by the separation means to auxiliary gas ejector means provided in the liquid conduit downstream of the main gas ejector means.

13. A method, according to claim 10, in which:

the liquid and mixture of free first and second gases discharged into the separation means are discharged through an upwardly extending mixing tube having an inlet end, an outlet end disposed within the separation means, and sides diverging in such a manner that the cross-section of the mixing tube is greater at the outlet end than at the inlet end; and in which a level of discharged liquid in the separation means is maintained between predetermined limits.

14. A method, according to claim 13, in which liquid discharged though the mixing tube is subjected to turbulence induced by at least one stepped increase in the cross-section of the mixing tube.

15. A method, according to claim 10, wherein the liquid passed through said liquid conduit is sea water, said first gas being oxygen, said second gas being nitrogen.

16. A method, according to claim 10, wherein said removing includes passing the conveyed gas through a catalytic burner.

17. A method, according to claim 10, wherein said separating includes passing the discharged mixture and liquid through a separation chamber.

18. A method, according to claim 10, wherein said main gas ejector means includes a mixing chamber having disposed therein an inlet nozzle connected in said conduit and having an inlet connected to said second separation means, and wherein said dissolving is effected by said main gas ejector means.

* * * * *